May 6, 1969  G. J. VIOLLET  3,442,018
COMBINED MEASURING INSTRUMENTS
Filed Oct. 31, 1966  Sheet 1 of 5
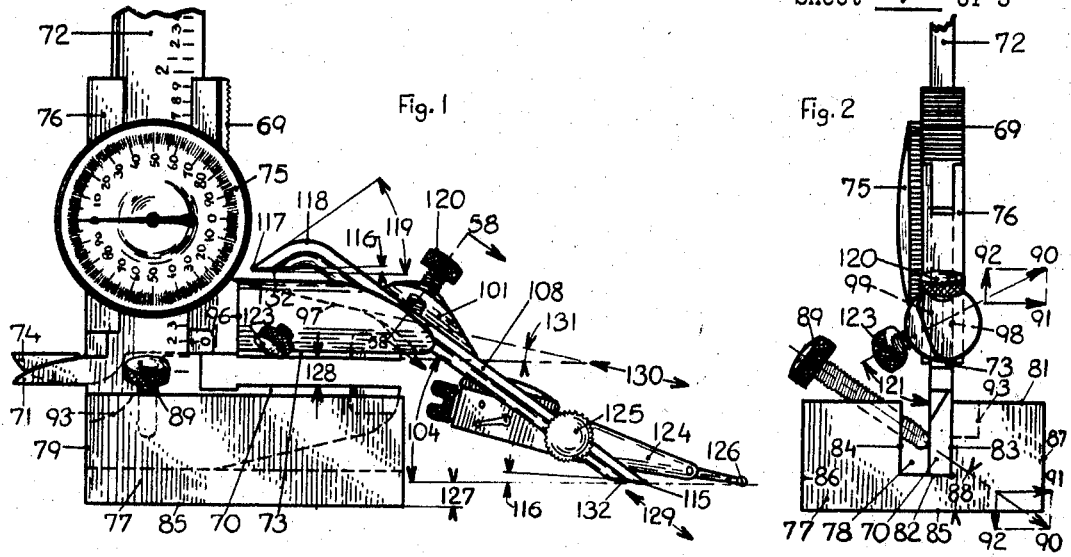
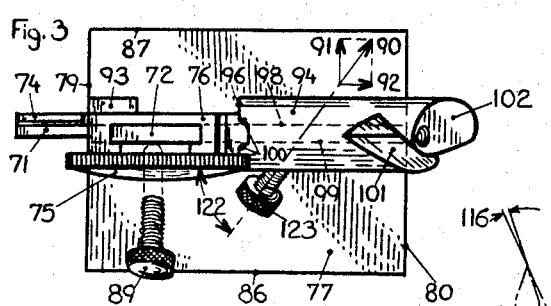
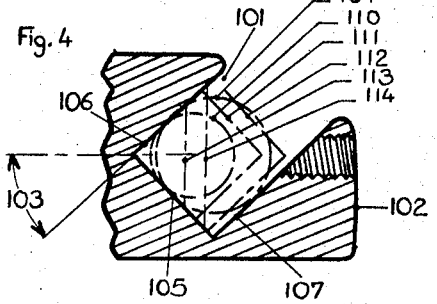
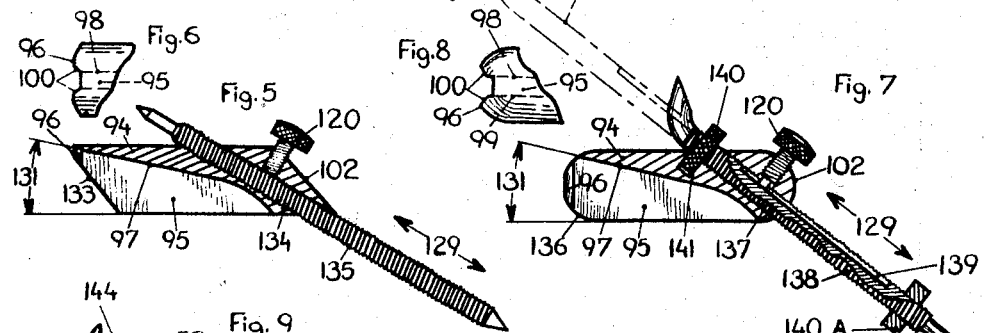
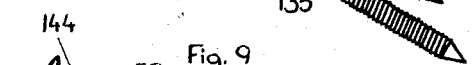
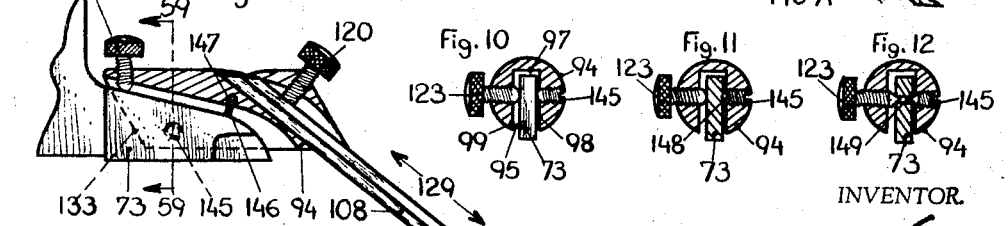
INVENTOR.
Gerard Viollet May 6, 1969  G. J. VIOLLET  3,442,018
COMBINED MEASURING INSTRUMENTS
Filed Oct. 31, 1966  Sheet 2 of 5
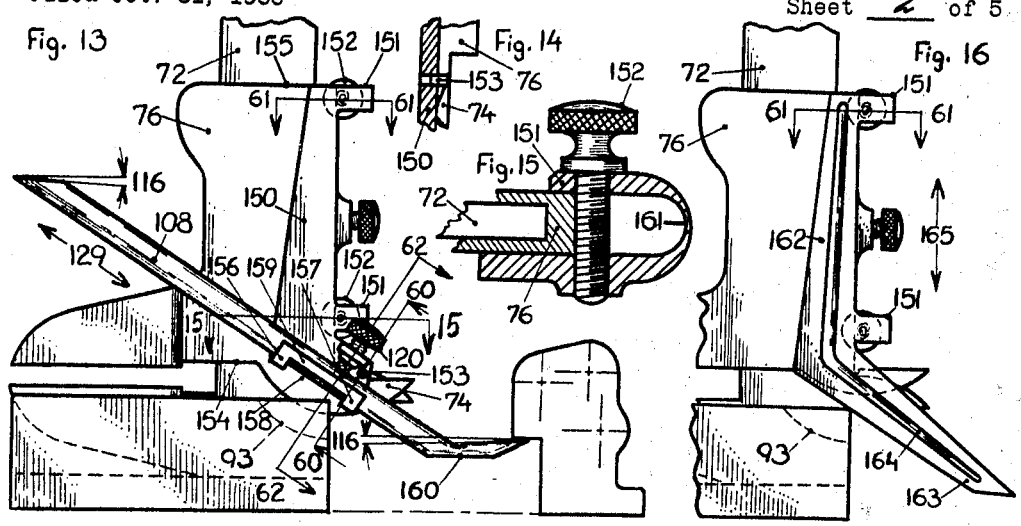

May 6, 1969  G. J. VIOLLET  3,442,018
COMBINED MEASURING INSTRUMENTS
Filed Oct. 31, 1966  Sheet 3 of 5
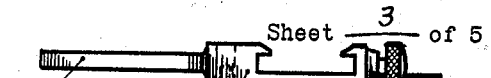
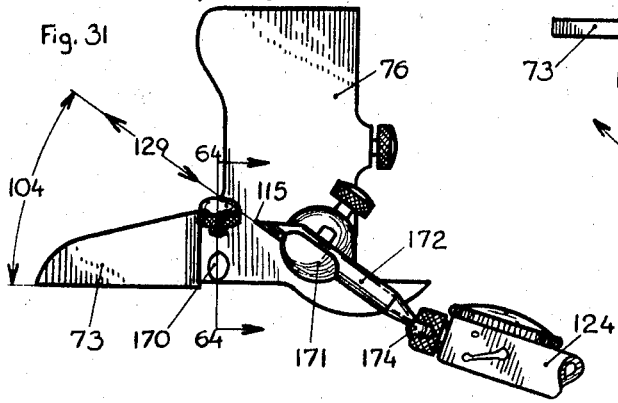
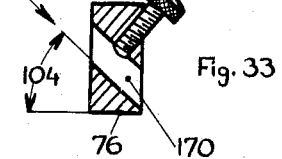
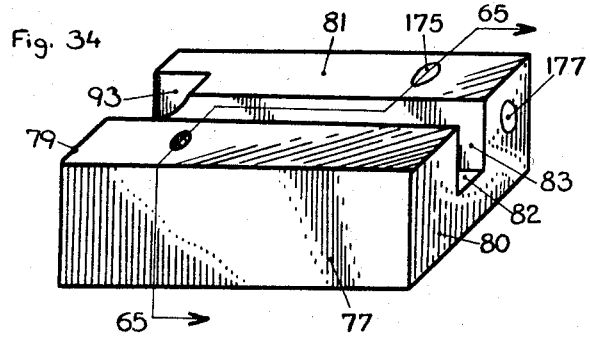
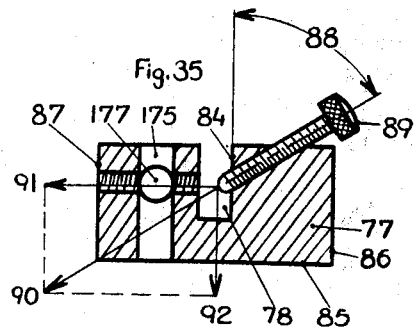
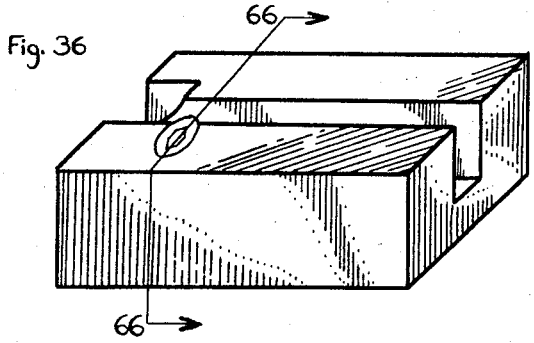
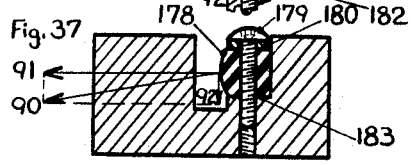
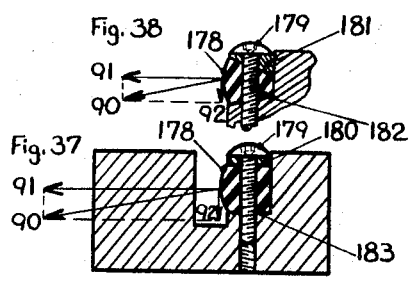
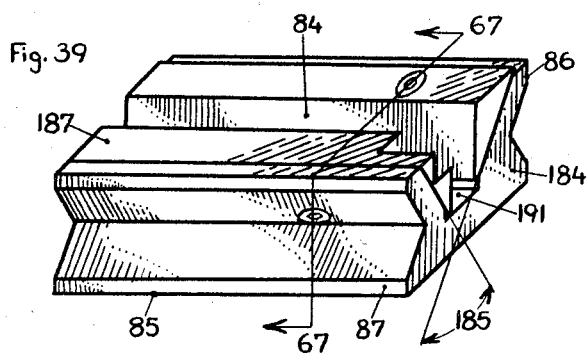
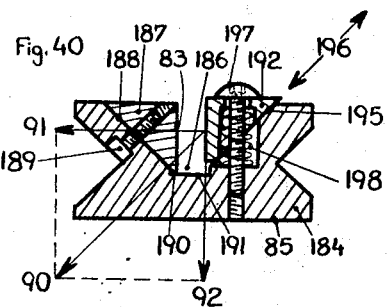
INVENTOR.
Gerard Viollet May 6, 1969  G. J. VIOLLET  3,442,018
COMBINED MEASURING INSTRUMENTS
Filed Oct. 31, 1966  Sheet 4 of 5
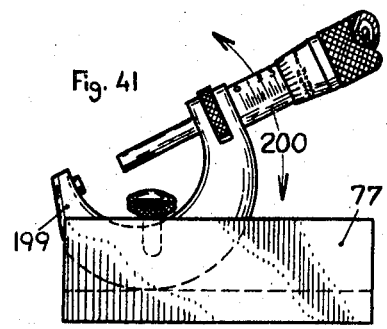
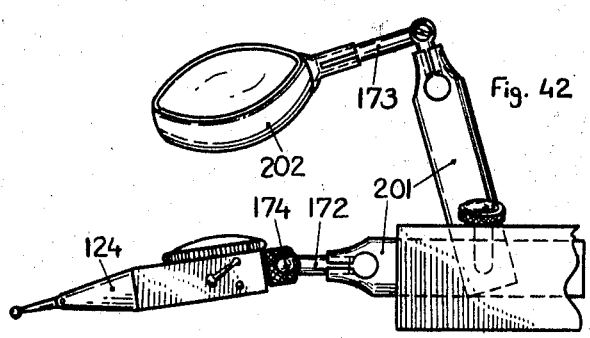
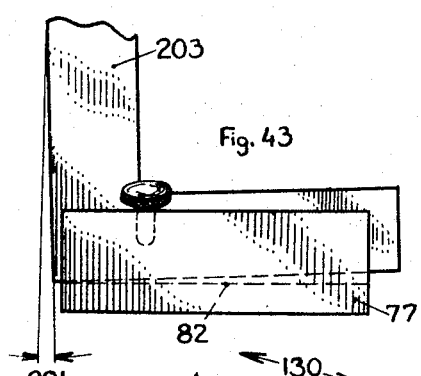
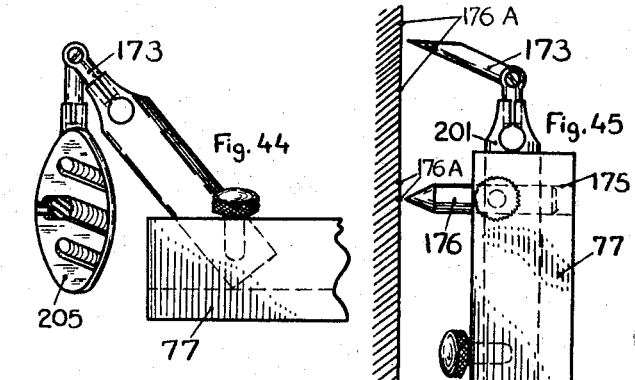
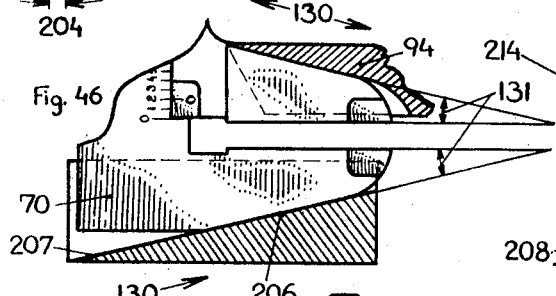
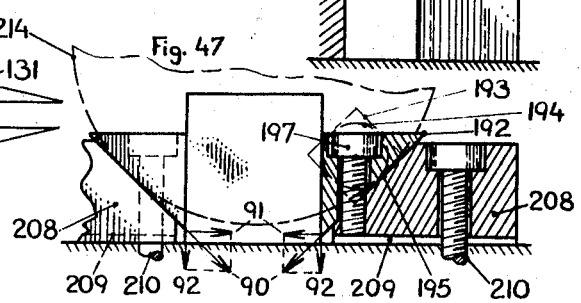
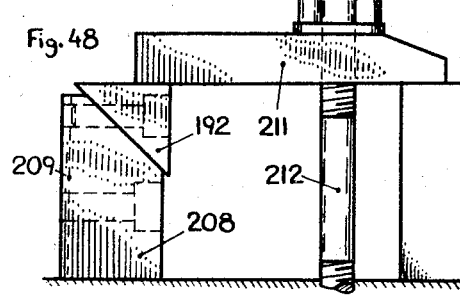
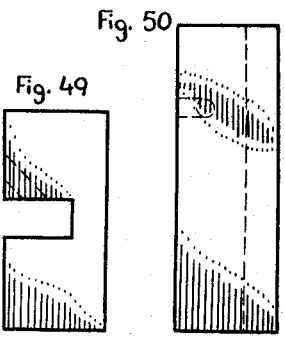
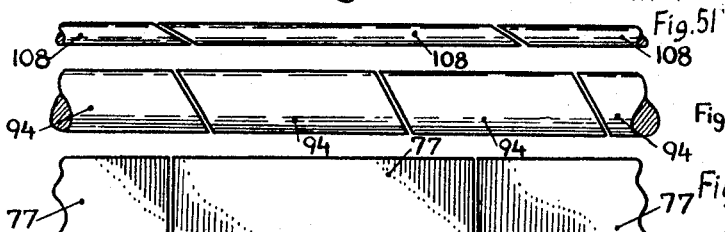
INVENTOR.
Gerard Viollet

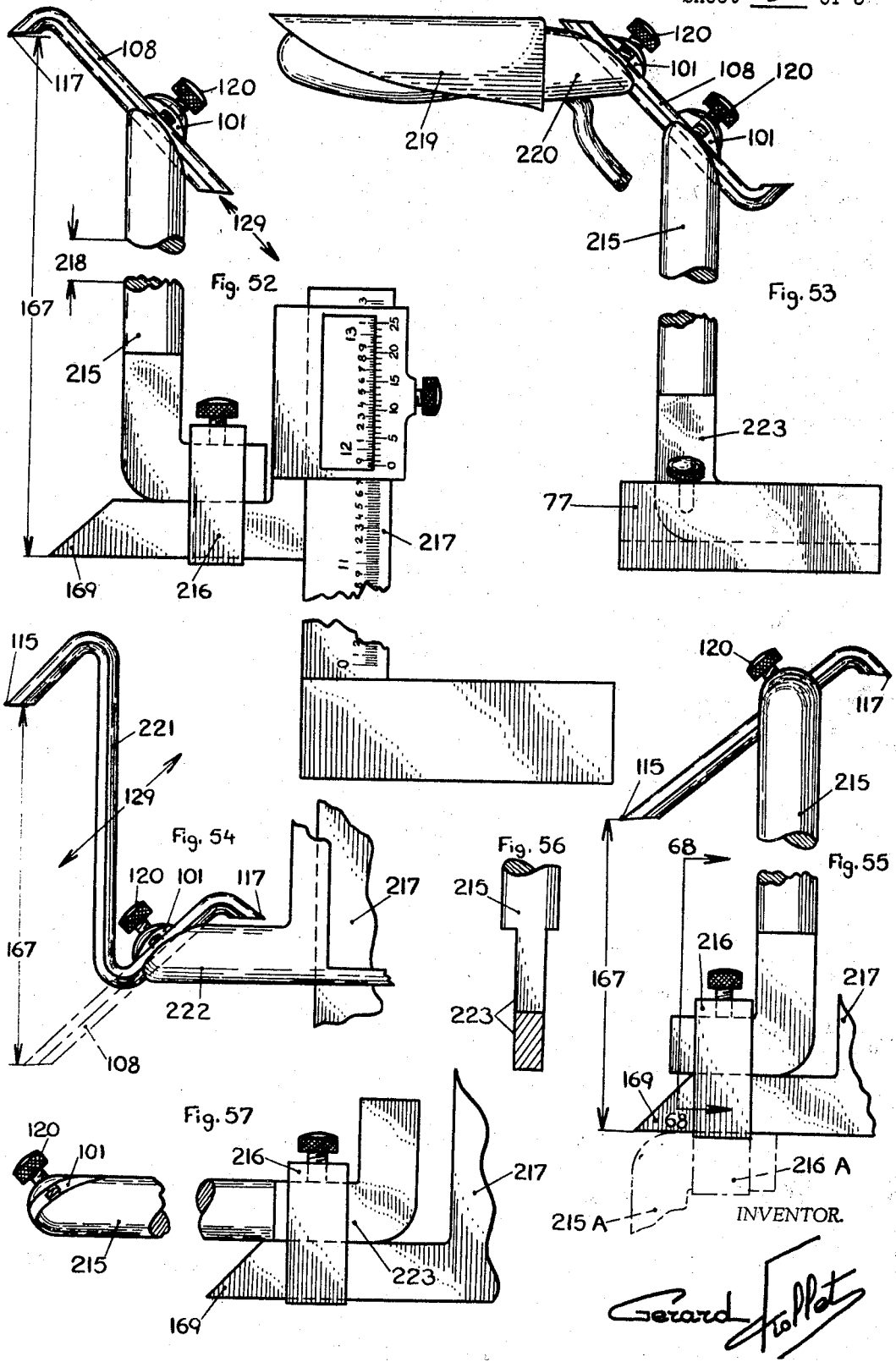

United States Patent Office 3,442,018
Patented May 6, 1969

3,442,018
COMBINED MEASURING INSTRUMENTS
Gerard J. Viollet, El Segundo, Calif.
(1619½ W. 134th St., Gardena, Calif. 90249)
Filed Oct. 31, 1966, Ser. No. 590,723
Int. Cl. G01b 3/22
U.S. Cl. 33—169
5 Claims

ABSTRACT OF THE DISCLOSURE

The height gauge has a scriber holder mounted on the movable jaw of the vernier caliper. The slot in the holder for receiving the jaw has an incline surface cooperating with the inclined surface of the jaw for varying the distance between the scriber mounted in the holder and the reference surface upon which the height gauge rests.

---

The principal object of my invention is to provide universal gauging devices adaptable on any "universal" dial caliper and on any "universal" vernier caliper; such "universal" calipers are manufactured as per a standard by different tool makers, said calipers are "universal" because their "direct" outside, inside, depth measurements, and sometimes "direct" outside, inside, depth, step measurements; these calipers have such a very narrow and short surface at the end of their beam near the measuring jaws that it was not possible to fasten them efficiently, said narrow and short surface is square with said beam; such calipers have also opposite to their outside jaws measuring surfaces, other surfaces angular to said measuring surfaces, said angular surfaces offer an excellent opportunity for micro adjustment sliding along them, said universal gauging devices fit also other calipers which are not universal but offer also the same very narrow and short surface at the end of their beam, and angular surfaces opposite to their outside measuring surfaces.

An important object of my invention is to use a part of said universal gauging device as a stand for holding any standard micrometer, square, protractor, snap gage, clamp, indicator, magnifier, mirror etc.

An important object of my invention is to provide universal non glare scribers; and adjustments and micro adjustments.

Another important object of my invention is to provide a universal compounded angular slot, and the manner of making it.

A further important object of my invention is to provide "hold down" clamping devices; adjustable V; adjustable vice.

A still further important object of my invention is to provide a universal extension range adaptable on any conventional height gage, and provide a height gage within a height gage.

The principal advantage of my invention is universality.

An important advantage of my invention is to provide devices which are inexpensive, simple, durable, adaptable, demountable, interchangeable, compact, precise, easy to use, quick to set up, attractive in appearance.

Other and further objects and advantages of my invention will be apparent from the following description thereof and from the claims appended thereto.

In the drawings wherein like numerals refer to like or corresponding parts throughout the several views:

FIGURE 1 is a front view of the universal dial caliper, base, scriber holder, scriber, universal dial test indicator with standard body clamp.

FIGURE 2 is a side elevation of FIGURE 1 without scriber and dial indicator.

FIGURE 3 is a top plan view of FIGURE 1 without scriber, dial indicator, scriber lock screw.

FIGURE 4 is an enlarged fragmentary sectional view taken on line 58—58 of FIGURE 1.

FIGURE 5 is a central sectional view of the scriber holder and a rotating scriber.

FIGURE 6 is a fragmentary top plan view of FIGURE 5.

FIGURE 7 is a central sectional view of a scriber holder, and rotating knurled nuts, and a sliding guided scriber.

FIGURE 8 is a fragmentary top plan view of FIGURE 7.

FIGURE 9 is a central sectional view of a scriber holder, fastened on the sliding jaw of a universal caliper.

FIGURES 10, 11, 12 are different sectional views taken on line 59—59 of FIGURE 9.

FIGURE 13 is a rear elevational view of the universal caliper, a base, a scriber holder, scriber, part to be scribed.

FIGURE 14 is a fragmentary sectional view taken on line 60—60 of FIGURE 13.

FIGURE 15 is an enlarged fragmentary sectional view taken on lines 15—15 of FIGURE 13.

FIGURE 16 is a fragmentary, same view than FIGURES 13, 15, with a different scriber.

FIGURES 17 through 24 are different enlarged sectional views taken on lines 62—62 of FIGURES 13, 28.

FIGURE 25 is a rear elevational view of the universal caliper slide, a scriber holder, a scriber.

FIGURE 26 is a side elevation of the scriber holder of FIGURE 25.

FIGURE 27 is a fragmentary bottom view of the round scriber of FIGURE 25.

FIGURE 28 is the same view than FIGURE 25 with the scriber holder made of different stock material.

FIGURE 29 is a sectional view taken on line 63—63 of FIGURE 28.

FIGURE 30 is a fragmentary bottom view of the square scriber of FIGURE 28.

FIGURE 31 is a rear elevational view of the slide of a universal caliper showing a scriber holder through its jaw; a scriber holder on its rear; a fragmentary dial indicator.

FIGURE 32 is a top plan view of FIGURE 31 without dial indicator.

FIGURE 33 is an enlarged sectional view taken on line 64—64 of FIGURE 31.

FIGURES 34, 36, 39 are perspective view of different bases.

FIGURE 35 is a broken sectional view taken on line 65—65 of FIGURE 34.

FIGURES 37, 38 are sectional views taken on line 66—66 of FIGURE 36.

FIGURE 40 is a sectional view taken on line 67—67 of FIGURE 39.

FIGURES 41, 42, 43, 44, 45 are front views of bases holding whether a micrometer, a dial indicator, a magnifier, a square, a mirror, a reference lines indicator.

FIGURE 46 is a central sectional view of a scriber holder, a base; and a fragmentary view of a universal caliper.

FIGURE 47 is a sectional view of a universal hold down clamping device, adjustable V, adjustable vise, part to be clamped; device is almost similar to device of FIGURES 39, 40.

FIGURE 48 is the same device than FIGURE 47, in a vertical position, a clamp, a bolt, a part to be clamped.

FIGURES 49, 50 are views of a base as it can be used on all its sides.

FIGURE 51 is a front view of scribers, as cut in a bar of material.

FIGURE 51A is a front view of scriber holders, as cut in a bar of material.

FIGURE 51B is a front view of bases, as cut in a bar of material.

FIGURE 52 is a front view of a universal extension range and scriber, adapted on a conventional height gage.

FIGURE 53 is a front view of the same universal extension of FIGURE 52, a base, a light.

FIGURE 54 is a front view of a scriber extension range; a fragmentary view of a height gage having the universal slot.

FIGURE 55 is a rear view of the same universal extension range and scriber than FIGURE 52, but in a reverse position.

FIGURE 56 is a fragmentary sectional view taken on line 68—68 of FIGURE 55.

FIGURE 57 is a front view of the same universal extension than FIGURE 52, but in a horizontal position.

Referring to the drawings, the numeral 69 designates a caliper, which is preferably a universal dial caliper or a universal vernier caliper. The caliper 69 has an outside measuring jaw 70, and an inside measuring jaw 71 interdependent of a beam scale 72; another outside measuring jaw 73, and another inside measuring jaw 74, and a direct reading dial or vernier 75 interdependent of a slide 76 travelling along said beam scale 72.

In FIGURES 1, 2, 3, 34, 35, a preferably rectangular base 77 having a slot 78 extending from one end surface 79 to the other end surface 80 and open to its top surface 81; said slot 78 having a bottom 82 perpendicular to one of its walls surface 83; and perpendicular, or about perpendicular, or angular to the other of its walls surface 84; and parallel to the bottom surface 85 of the base 77. Said base 77 having two more side surfaces 86 and 87; and having one or more angle 88 lock screw 89 which locks as per force 90 said force 90 is transformed in a clamping force 91 and a holding down force 92. A clearance 93 is provided for inside measuring jaw 74 or for scriber holder when such scriber holders as in FIGURES 13, 16, 31 are used in a low position.

In FIGURES 1, 2, 3, 4, 5, 6, 7, 8, a preferably round bar scriber holder 94 having a slot 95, said slot is better shown in longitudinal section in FIGURES 5 and 7, and in transverse section in FIGURE 10; said slot extending from stop end 96 to approximately ⅔ of said holder 94. Said slot 95 having a bottom 97 angular as per longitudinal axis of said holder 94, and concaved at its end, as to match the standard low angle of universal calipers; said bottom 97 is perpendicular to one wall surface 98 of the slot 95, the other wall 99 can be perpendicular as FIGURE 10, or angular as FIGURE 29. Said slot walls surfaces 98 and 99 are ended with a chamfer 100 to clear radius on caliper jaw, said chamfers are best shown in FIGURES 3, 6, 8. In FIGURES 1, 2, 3, 4, 9, a compounded angular slot 101 is provided at the opposite end 102 of said holder 94. Said slot 101 having an angle 103 on one side in FIGURE 4 and another angle 104 on the other side in FIGURE 1. Said slot has a bottom 105 perpendicular to two wall surfaces 106 and 107 in FIGURE 4, said wall 107 in FIGURES 17, 18, 21 can be angular to 106 and 105. Said slot has such a simple shape (FIGURE 4), that it is made in one time without any further work. Said bottom surface 105 and wall surface 106, offer a nest for a scriber 108 or a shank for accessories or a tool; said scriber or shank, or tool, can have a cross section of different type and different size, as shown with interrupted lines in FIGURE 4, a big round section 109, a small round section 110, a small square section 111, a big square section 112, a small triangular section 113, a big triangular section 114. Said scriber 108 as per scriber first form of execution in FIGURE 1, is a square scriber pivoted around its longitudinal axis as shown also under the numerals 111 and 112 in FIGURE 4. Said scriber has one scribing end edge 115 made as per an angle 104 minus very low relief angle 116, said end 115 is for normal use scribing; said scriber has another scribing end edge 117 bent at 118, said end 117 is made as per angle 119 minus very low relief angle 116, and is used for reverse scribing, said angle 119 is preferably equal to angle 104. A scriber lock screw 120 in the longitudinal vertical plan of the holder and square with the scriber nest, fastens said scriber, or accessories or tools. A double compounded angle 121 in FIGURE 2 and 122 in FIGURE 3 lock screw 123 fastens said holder 94 on jaw 73, said lock screw 123 which locks as per force 90, said force 90 is transformed in clamping force 91 and a holding down force 92 in both FIGURES 2 and 3; said double compounded angle lock screw pulls bottom 97 of holder slot 95 against the upper side of the jaw, and pulls the stop end 96 against shoulder of the slide 76, making a locator that the scriber may be set once and for all.

In FIGURE 1 a dial test indicator 124 is fastened on the scriber 108 with a standard dial indicator body clamp 125 or spindle clamp or indicator attachments 125, so that the indicator point 126 may be lined up on zero with the scriber point 115, and the dimension 127 from base bottom 85 to the indicator point 126 or scriber point 115 is equal to the dimension 128 between the jaw 70 and the jaw 73. Scriber 108 can be adjusted primarily up and down along the angle 104, as per arrows 129 and first form of "adjustment"; and micro adjusted as per arrows 130 and first form of "micro adjustment" by sliding holder 94 along the standard low angle 131 of its bottom slot 97, preferably when lock screw 123 has only the angle 121, or when screw has no angle 121 and 122 but is perpendicular to the caliper jaw 73 as lock screw in FIGURE 10. There is no clamping or thickness between the measuring surfaces 70 and 73, permitting thus jaws to come in contact of each others and the reading on slide dial or vernier 75 starts at zero, corresponding to the zero at beam scale 72. Nothing stops said jaws 70 and 73 from zeroing. Said scriber is easily adjusted on zero; or set on a reference surface or reference line, eliminating thus paper work; without calculation, measure, and register all further dimensions required; and makes possible to take any given measure as a basis. Said scriber is a nonglare scriber having its shiny sharpening surface 132 at its bottom as per a relief very low angle 116, said shiny surface 132 is invisible to the operator's eyes and does not fatigue the operator's eyes specially when said operator is using the scriber during many hours. When scribing edges 115 and 117 are shining, it is because said edges are dull, and it indicates the need of sharpening. Said scriber bottom surface 132 can be resharpened with any conventional grinder, sander, diamond wheel, diamond file or die file, can be stoned, lapped or the like sharpenings, making thus the easiest scriber to sharpen.

In FIGURE 5 a scriber holder 94 as in FIGURE 1 except: that end 133 is not square to the scriber holder longitudinal axis, but angular to said axis, and parallel to the other end 102. Narrow stop end 96 is a square to scriber holder longitudinal axis. And that an angular threaded hole 134 is provided at end 102 of said holder 94 to receive a micro adjusted threaded scriber 135 or micrometer head. Said scriber is raised or lowered by turning its threaded body one way or the other, as per "micro adjustment" second form of execution. Scribing ends of said scriber 135 are cone shaped, as per scriber second form of execution.

In FIGURE 7 a scriber holder 94 as in FIGURE 1 except: that ends 136 and 102 are half spherical. And that an angular non-threaded hole 137, or a compounded angular slot 101 as in FIGURES 1, 2, 3, 4, are provided at end 102 of said holder 94 to receive a micro adjusted threaded scriber 138, said threaded scriber has one or more longitudinal guide slot 139 and a knurled or graduated fine adjustment threaded drum nut 140 or micrometer drum nut turning around said threaded scriber, and located in a holder slot 141. Said scriber 138 is raised or lowered by turning the drum nut 140 as per micro adjustment third form of execution. A preferably dog ended lock screw 120 is used to guide slot 139 and to lock scriber when adjusted. Said scriber 138, when inserted into the compounded angular slot 101, can have one more knurled or graduated nuts 140A; one nut 140 for normal scribing, the other 140A for reverse scribing; it is to avoid rotating nut all the way, from one end to the other end; however if the scriber 138 is long enough as shown in interrupted lines 142 to have only one nut 140 in its middle, it can be reversed without rotating the nut, or will need only little adjusting. In claims 5 and 6, scriber can be a micrometer head or micrometer type with graduations corresponding to the vertical sinus. Thimble of micrometer will need more revolutions for less sinus travel of the spindle, where from it results a better precision of travel. Said holder in FIGURE 7 with a hole instead of a compounded angular slot can hold a round normal scriber, as scribers in FIGURES 13 and 25. Said holder in FIGURE 7 with a compounded angular slot instead of a hole, can hold a square or round normal scriber as scribers in FIGURES 1, 9, 13, 25, 31, 54.

In FIGURES 9 and 10, a scriber holder 94 as in FIGURE 1 except that said holder is a rocking micro adjusted holder to rise or lower the scriber point as per arrows 143. A micro adjusting screw 144 when turned, rocks holder around pivot screw 145 and lock screw 123, and press the spring 146 which is held in a hole 147 in the holder, as per a "micro adjustment" fourth form of execution. Said pivot screw 145 is preferably tight in its thread, and said pivot screw 145 and lock screw 123 are whether half spherical radius or bullet nose ended. Said caliper jaw 73 is without modification. Scriber is as per scriber third form for execution.

FIGURE 11 is the same view than FIGURE 10, except that said "pivot screw" 145 is cone ended, and that caliper jaw 73 has a locating center mark 148.

FIGURE 12 is the same view than FIGURE 11, except that said lock screw 123 is cone ended and that caliper jaw 73 has a locating hole 149. FIGURES 10, 11, 12 have lock screw hole and pivot screw hole in line so that they are made in one time.

In FIGURE 13, a scriber holder 150 as a scriber holder second form of execution. Said scriber holder 150 made preferably of sheet material is fastened with two clamps 151 which are tight with screws 152 on the slide 76. A slug stop or stop 153 is preferably resting against the precise measuring surface of the inside measuring jaw 74 of slide 76; said stop 153 can be resting against the bottom 154 of the slide 76; said stop may be resting on top 155 of slide 76. A nest as per angular slot 101 in FIGURES 1, 2, 3, 4, is offset. A nest composed of 105 and 106 best shown in FIGURES 17, 18, 19, 21, 22, as per angular slot 101 in FIGURES 1, 2, 3, 4, is offset from slide to let long scribers 108 or accessories all the way through; said nest is composed of two rests 156 and 157; there is an empty space 158 between the two rests; a spacer and strengthening rib 159 connects the two rests; said nest is opposite to lock screw 120. Said long scriber 108 is in reverse scribing position, said curved section 118 FIGURE 1 can have a flat 160 FIGURE 13 and said reverse scribing point 117 can be lined up on zero with the bottom base 85.

In FIGURE 14, the slug stop 153 rests on inside jaw 74 precise measuring surface of the caliper slide 76.

In FIGURE 15, the clamp 151 is thinner in its curved portion 161 as to spring easily and to suit different thicknesses of slide 76. Said clamps 151 are fastened with screw 152 on the solid part of the slide and cannot distort or squeeze it.

In FIGURE 16 a similar scriber holder 162 than FIGURE 13, except that scriber 163 is made as a part of said holder 162, as per scriber fourth form of execution; a strengthening rib 164 is optional. Said scriber 163 is raised or lowered as per arrows 165 by loosening lightly the clamps 151, as per scriber "adjustment" second form of execution. There is no stop 153.

In FIGURES 17 through 24 are different forms of execution of the nests 156 and 157.

In FIGURES 25 and 26 the scriber holder 166 is similar to scriber holder in FIGURES 1, 2, 3, 4, except that its longitudinal axis is perpendicular to the jaw 73 of the slide, and that said compounded angular slot 101 is offset from slide 76 and jaw 73, and that lock screw 123 has only the angle 121. Scriber has normal use point 115 on both ends, as scriber in FIGURE 9. When long reverse scriber as shown in interrupted lines 142 is mounted as shown FIGURE 25, it makes an extension range and it heightens the height gage of 167 dimension; and then the reverse scribing point 117 is used as a normal scribing point 115 and vice versa. When scriber is seen from its bottom as in FIGURE 27, it shows a bullet nose shaped long wearing scribing edge.

A square scriber in FIGURE 28 offers better scribing advantages and better working conditions than other scribers, and a less than 90° angle 168 in FIGURE 30. Scriber edge works as a knife edge instead of a scraper. If the scriber vertical plan is forming an angle more or less than 45° with the work, said scriber will still offer a knife like edge scribing end. The height gage will not shatter because the point is pulled along the work and not pushed when scribing, it is not possible to obtain the same knife edge work with conventional height gage scriber 169 in FIGURES 52, 55 and 57. Said less than 90° angle 168 offers no corner to bother the eyesight. Scribing and lining, and reference pick up, are made easier, sharper, shatterless, more precise than other conventional scribers.

The scriber and accessories holder 170 FIGURES 31 and 33 is similar to the angular non threaded hole of FIGURE 7, except that said hole is through the slide 76 near the jaw 73. The scriber and accessories holder 171 FIGURES 31 and 32 is similar to the compounded angular slot of FIGURES 25 and 26. A scriber 163 as in FIGURE 16 can be also made as a part of the slide and used with a micro adjusted base as in FIGURE 46. A scriber 172 in FIGURE 31 is a friction holder for dial indicator or can be long and short arm 173 as FIGURE 45, said friction holder is standard and is sharpened as per angle 104 minus 116. Said scriber having a scriber end 115, and a ball friction 174 opposite end, FIGURE 31, and a scriber having a long and short arm 173 FIGURE 45, are standard dial indicator attachments, and are as per scriber fifth form of execution.

The base 77 in FIGURES 34 and 35 is the same base described in FIGURES 1, 2, 3, except that there is one or more hole 175 for inserting diamond dressing tools for dressing a grinding wheel, or for inserting accessories 176 as FIGURE 45, or for guide pin, or for storage of said tools. A first hole 175 may have a second hole 177 perpendicular to its axis, so that they can be used in different heights, depend on which side stands the base. Said holes can use the same lock screw 89 for holding diamond and accessories. If a diamond dressing tool is inserted in hole 175 or 177 the base 77 is then a diamond stand, said stand may be used on any of its sides, whether it is for dressing the periphery or the side of a grinding wheel. Said hole 175 is preferably located on the same side than lock screw 89, under the head of angular screw 123, opposite position is shown on drawing for clearness FIGURE 35, so that a portion of angular screw 123 head may enter into said hole 175 when slide 76 is at its lowest position. Diamond lock screw 89 may extend from side of base 86, through diamond holes 175 and 177, to slot 78 and becomes then an additional lock screw 89 to be tighten secondarily, said secondary screw 89 is perpendicular to the jaw 70 of caliper.

In FIGURES 36, 37 and 38, a similar base than FIGURES 34 and 35, except that locking device is a resilient piece of material 178 pressed against caliper or accessories, when locking screw 179. In FIGURE 38, the locking device is similar to the one in FIGURE 37, except that resilient piece of material is pressed between two angles. Parallel washer 180 can take the place of angular washer 181 and vice versa. Said angular countersink 182 can have a flat bottom 183 with an angular washer 181, all depend how much locking force 91 and holding down force 92 is needed. Said resilient piece of material 178 and washers 180 and 181 can be round, rectangular etc.

In FIGURES 39 and 40 a base 184 is used for the same purpose than base 77, except that it is also V's block for use in layout, milling, drilling, grinding, etc. Approximately in the center, or in the center, a big V 185 extending from one end to the other end of said base 184 V block, has a longitudinal clearance slot 186 parallel to the bottom surface 85 of the base 184. A triangular rail 187 is held in position on one 45° or else face 188 of the V with one or more screw 189; a flat edge land 190 rests on bottom 191 of the slot 186 and a surface 83 is square to the bottom surface 191. Another triangular rail 192 or square rail 193 or round rail 194 or the like shape shown in FIGURE 47 is sliding on the other 45° or else face 195 of the V as per arrows 196, when one or more screw 197 is tighten, offering same forces 90, 91, 92 than as in FIGURE 35. An optional spring 198 may be added to ease functioning. Said rails 192, 193, 194 can be made of resilient material without spring. A surface 84 in this hold down triangle is not necessarily flat, it can have a shape to fit special tools. On the sides 86 and 87 of said base 184 two V's stand for smaller work and for the operator's finger grip.

Said hold down devices have a clamping resilient piece of material 178, 192, 193, 194 who will not mar or scratch finished surfaces, or damage paint or enamel or delicate parts, and will conform to uneven surfaces, distributing clamping pressure uniformly. Said clamping resilient piece of material has: corrosion protection, electrical insulation, thermal insulation, self locking, shock absorbing, vibration resisting, color matching etc.

In FIGURE 41, a base 77 holds a micrometer frame 199 instead of a universal caliper jaw 70. Said base 77 is used as a micrometer stand on any of its sides, and micrometer can be rotated as per arrows 200.

In FIGURE 42, a dial test indicator 124 with its own standard universal friction 172 and universal shank 201, or a magnifier or a pocket microscope 202 are mounted on base 77. Base 77 is then an indicator stand, or a magnifier stand, or a pocket microscope stand.

FIGURE 43 shows a square mounted on base 77, blade 203 can be square with bottom surface 82 to check squareness, or out of square to compare the deviation of out of square angle 204. Said base 77 is used as a square stand. If a bevel protractor is inserted on place of square, the base 77 is then a bevel protector base.

In FIGURE 44 a mirror 205 is inserted in base 77, to show a hidden part machined on a machine tool; or to show the rear side working mechanism of a device, or for assembling or adjusting special parts, etc.

FIGURE 45 shows the base 77 in a vertical position, holding a universal shank 201 in which has been inserted a standard dial test indicator attachment "long and short arm" 173 sharpened at one end. Fastened in hole 175 is an accessory 176. Said accessory 176 and "long and short arm" 173 are used for indicating reference lines on a machine tool or on a part, or the like references 176A.

FIGURE 46 shows a caliper outside measuring jaw 70 having its surface 206 resting on bottom slot 207, said bottom slot is angular as per angle 131, and jaw 70 surface 206 may slide along angular bottom slot 207, as per arrows 130 as to be raised or lowered as desired, and then lock into proper position, with a lock screw 89 having its angular axis in a perpendicular plan to the bottom of the angular slot. Scriber holder 94 shows micro adjustment 130 and angle 131 as explained for scriber holder in FIGURE 1.

In FIGURE 47 a similar hold down clamping device used in FIGURES 39 and 40, except that there is an angular block 208 instead of a V block 184. Said angular block 208 has one or more longitudinal slot 209 at its bottom to receive a guide (such as key, plate, dowels etc.). Said block 208 can have a guide instead of a slot (such as dowels, key, etc.). Said block 208 can have one or more longitudinal hole through its body, instead of said slot. Said angular block 208 can be clamped with a screw 210 on a machine. Said angular block 208 can also be only an angular washer 181, or on a plate, or on a tool; or without screw 210 on a magnetic chuck; or can be used as movable jaw in a vise etc.; or can be used as jack or as rest; or as adjustable rising block for clamping as in FIGURE 48 which shows angular block 208 sliding clamping rail jaw 192, machine clamp 211, machine bolt 212, and part to be machined 213. Said FIGURE 47 shows two angular blocks 208 and an interrupted line 214 representing a cylindrical part; in that case angular blocks 208 are used as adjustable V block, to hold shanks of different sizes. Said FIGURE 47 shows in interrupted line, a round 194 clamping rail jaw, a square 193 clamping rail jaw, a triangular 192 clamping rail jaw. Said round rail 194 is a better hold down in fact that its contact surface with the surface 195 of the V, is offset from screw 197; said round rail 194 can also be half round.

FIGURES 49 and 50 show that said base may be used on any of its sides, as stand for accessories or tools, or as set-up block, or block etc., for set-ups or layouts etc., on bench, on surface plate, on machine table, on magnetic chuck, etc. or for diamond dressing tool stand as explained in FIGURES 34 and 35.

In FIGURE 51, are scribers 108 and 138 as shown in FIGURES 7, 9 and 25, and other scribers if their bent side 118 is as shown in FIGURE 7, said scribers are preferably square; in FIGURE 51A, are scriber holders 94 as FIGURES 5 and 9, preferably round; in FIGURE 51B, are bases 77 preferably rectangular. Said scriber, scriber holder and base, as they may be cut in a clean bar of material with a minimum of scrap material and labor. Other scribers, scriber holder, and bases are also taken in a clean bar of material, with only a little more scrap material and labor.

In FIGURE 52 an adjustable universal range extension 215 has been fastened with a conventional clamp 216 on a scriber 169 of a conventional height gage 217. Said universal range extension 215 has the same universal compounded angular slot 101 described in FIGURES 1, 2, 3, 4, but in a vertical position; and reverse scribing end 117 of scriber 108, becomes a normal use point as explained for 117 in FIGURE 25. Said height gage 217 has then a range extended of length of universal range extension 215 plus the length of the sinus of the angular scriber 108; said length is extended of dimension 167. The dimension 218 shows that universal range extension can be of any length.

In FIGURE 53, a light 219, having an end 220 with a universal compounded angular slot 101 described in FIGURES 1, 2, 3, 4, and a lock screw 120. A scriber 108, but preferably a long and short arm attachment 173 as in FIGURES 42, 44, 45, is fastened on one end, in the light end 220 slot 101, and in the other end in the range extension 215 slot 101. Said range extension 215 is mounted in base 77, and can be mounted on height gage of types described; said light end 220 can be mounted on a magnet, on a standard magnetic base, on a wire, on a scriber, any where there is a rod of any shape fitting the slot 101. Said light end 220 compounded slot 101 can be made of sheet metal as FIGURES 13, 17 through 24, 28.

In FIGURE 54 a scriber 221 of such a shape that it has a range extension of dimension 167, for most scriber holder described. A universal holder 222 is made as part of a slide of a height gage 217. For any bent scriber as 221, there is an advantage of a universal compounded slot 101; scriber 221 is not inserted through a hole, but just dropped into said slot 101.

In FIGURE 55, same extension 215 than FIGURES 52 and 53, but rotated of 180° on scriber 169; point 115 is then used in normal scribing. Said extension 215 is shown with clamp 216 in interrupted line 215A and 216A, as per another position, for deep reach use.

FIGURE 56 shows the narrow rectangular end 223 of the extension 215. Said end 223 is not necessarily narrow, it can have the same shape than extension body 215, but with a longitudinal slot 95 and lock screw 123 as holders in FIGURES 1, 2, 3, 5, 7, 9, 46, or a lateral slot as in FIGURES 25, 26, except that slot is perpendicular to the longitudinal axis of the extension body 215, because height gage scriber 169 has no angle 131. Said end 223 can also have a rocking device as in FIGURES 9, 10, 11, 12. A holder as FIGURES 1, 2, 3, 4, 5, 7, 9, 25, 26, 28, 29, but with a slot 95 having no angle 131, can be adapted on scriber. 169.

FIGURE 57 shows the same extension 215 than FIGURES 52, 53, 55, 56, but in a horizontal position, for far reach use.

A caliper 69 as FIGURES 1, 13 etc. can have its jaw 70 clamped without its base 77 on the height gage scriber 169, making thus a height gage within a height gage.

Screws can be of any type, and lock screws 89, 120, 123, 144 are preferably knurled thumb screws soft nose clamp as to eliminate marring and dimpling and scratch-of finished surfaces, and to conform to any surface, and to clamp on a threaded part, and to distribute clamping pressure uniformly.

While the invention is not concerned with the materials from which it may be made, it will be understood that certain features and subcombinations are of utility and may be employed without reference to other features and subcombinations, and that certain features and subcombinations of certain forms of execution may be combined with other features and subcombinations of other forms of execution. This is contemplated by and is within the scope of my claims. It is further obvious that various changes in details, in forms, and in proportions may be made as circumstances require or experience suggests without departing from the spirit of my invention within the scope of my claims. It is therefore to be understood that my invention is not limited to the pecific details shown and described.

Having thus described the invention, what is claimed as new is:

1. In a height gauge, supportable adjacent a reference surface for supporting a scriber, the combination of:
    a base supportable adjacent a reference surface;
    an elongated member mounted on said base and projecting outwardly therefrom:
    a movable jaw mounted on said elongated member for movement therealong toward and away from said reference surface, said movable jaw having an edge surface extending at an acute angle with respect to said reference surface;
    a scriber holder having surface means defining a slot in said scriber holder, a portion of said movable jaw including said edge surface thereof being receivable in said slot;
    releasable means for retaining said movable jaw in said slot of said scriber holder;
    said scriber holder including means for mounting the scriber on said scriber holder;
    said surface means of said scriber holder including a surface portion defining the inner end surface of said slot and engageable with said edge surface of said movable jaw whereby releasing of said releasable means and movement of said scriber holder relative to said movable jaw with said edge surface and said surface portion in engagement varies the distance between the scriber and said reference surface to permit fine adjustment of the height gauge;
    means supported by said base for measuring the distance between said reference surface and the scriber;
    said means for mounting the scriber on said scriber holder including surface means on said scriber holder defining a channel in said scriber holder, said channel being open at both ends and along at least one side thereof to permit insertion of the scriber into said channel from either of said ends or through said one side, said last mentioned surface means including at least three side surface regions intersecting to define two angles of approximately 90°, said scriber holder having a screw threadedly mounted thereon and engageable with the scriber to tightly clamp the scriber against at least one of said three side surface regions;
    said movable jaw defining a movable outside measuring jaw;
    a movable inside measuring jaw; and
    said base having a first surface and including a slot opening at said first surface for receiving a portion of said elongated member and a groove opening in said slot of said base and at said first surface of said base for receiving said movable inside measuring jaw when said movable inside measuring jaw is adjacent said base.

2. A combination as defined in claim 1 wherein said releasable means includes a screw rotatably mounted on said scriber holder and engageable with said movable jaw for clamping said movable jaw against said surface means, said surface portion being at least substantially flat, said screw extending at an acute angle with respect to the plane of said surface portion.

3. A combination as defined in claim 1 wherein said releasable means includes means for mounting said scriber holder on said movable jaw for movement about a pivotal axis and means mounted on said scriber holder and engageable with said edge surface of said movable jaw for pivoting the scriber holder about said axis.

4. A combination as defined in claim 1 wherein the axis of said screw forms an acute angle with at least two of said side surface regions whereby said screw urges the scriber tightly against said two side surface regions.

5. A combination as defined in claim 1 wherein said scriber terminates outwardly in a centrally located scribing point with a pair of cutting edges extending outwardly away from said cutting point.

References Cited

UNITED STATES PATENTS

| | | |
|---|---|---|
| 639,845 | 12/1899 | Chamberlain. |
| 889,447 | 6/1908 | Eichmuller. |
| 1,464,428 | 8/1923 | Hogarty. |
| 1,964,168 | 6/1934 | Lowe. |
| 2,454,327 | 11/1948 | Malsom. |
| 2,844,878 | 7/1958 | Zwierzynski _____ 33—170 |

FOREIGN PATENTS

| | | |
|---|---|---|
| 1,296,744 | 5/1962 | France. |
| 236,041 | 5/1945 | Switzerland. |

HARRY N. HAROIAN, *Primary Examiner.*

U.S. Cl. X.R.

33—18, 172